(12) United States Patent
Shimizu et al.

(10) Patent No.: US 9,307,027 B2
(45) Date of Patent: Apr. 5, 2016

(54) IDENTIFYING SERVER PROTOCOL FOR TRANSLATION IN SMART GRID

(71) Applicants: Toyota Jidosha Kabushiki Kaisha, Toyota-shi, Aichi-ken (JP); Toyota InfoTechnology Center Co., Ltd., Tokyo (JP)

(72) Inventors: Takayuki Shimizu, Mountain View, CA (US); Akihisa Yokoyama, Cupertino, CA (US); Kazuma Sato, Sunnyvale, CA (US); Kunihiko Kumita, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 347 days.

(21) Appl. No.: 13/742,280

(22) Filed: Jan. 15, 2013

(65) Prior Publication Data

US 2014/0201381 A1    Jul. 17, 2014

(51) Int. Cl.
*G06F 13/00* (2006.01)
*H04L 29/08* (2006.01)
*H04L 29/06* (2006.01)

(52) U.S. Cl.
CPC ............ *H04L 67/12* (2013.01); *H04L 67/2823* (2013.01); *H04L 69/08* (2013.01); *H04L 69/167* (2013.01); *H04L 69/24* (2013.01)

(58) Field of Classification Search
CPC ... H04L 41/0226; H04L 69/108; H04L 29/06; H04L 29/08072; H04L 29/06095; H04L 29/06068; H04L 29/0809; H04L 67/12; H04L 69/08; H04L 69/24; H04L 69/167
USPC ............................ 709/291, 295, 230; 340/870
See application file for complete search history.

(56) References Cited

U.S. PATENT DOCUMENTS

| 2003/0200325 | A1 | 10/2003 | Krishnaswamy et al. |
| 2003/0208561 | A1* | 11/2003 | Hoang et al. ................... 709/219 |
| 2003/0229603 | A1 | 12/2003 | Childress et al. |

(Continued)

FOREIGN PATENT DOCUMENTS

| EP | 2101393 | 9/2009 |
| WO | WO 99/33226 | 7/1999 |
| WO | 2009017602 | 2/2009 |

OTHER PUBLICATIONS

International Search Report and Written Opinion, PCT/JP/2013/006399, Feb. 18, 2014, (9 pages).

(Continued)

*Primary Examiner* — Robert B Harrell
(74) *Attorney, Agent, or Firm* — Patent Law Works LLP

(57) ABSTRACT

A system and method for managing smart grid communication is disclosed. The system includes a communication module, a discovery module, a translation module and a smart grid module. The communication module receives data initiating smart grid communication between a utility server and a communication node. The discovery module identifies a server protocol used by the utility server to communicate with the communication node. The discovery module identifies a node protocol used by the communication node to communicate with the utility server. The node protocol is incompatible with the server protocol. The translation module performs a protocol translation between the server protocol and the node protocol. The smart grid module handles the smart grid communication between the utility server and the communication node using the protocol translation.

18 Claims, 10 Drawing Sheets

(56) References Cited

U.S. PATENT DOCUMENTS

| | | |
|---|---|---|
| 2007/0038703 A1 | 2/2007 | Tendjoukian et al. |
| 2008/0080519 A1 | 4/2008 | Park et al. |
| 2009/0034419 A1* | 2/2009 | Flammer et al. .............. 370/238 |
| 2012/0029717 A1* | 2/2012 | Cox et al. ...................... 700/295 |
| 2013/0114582 A1* | 5/2013 | Husney ......................... 370/338 |
| 2013/0179061 A1* | 7/2013 | Gadh et al. .................... 701/123 |

OTHER PUBLICATIONS

The ECHONET Lite Specification, Version 1.00, ECHONET Consortium, Sep. 3, 2012, 309 pgs.

Smart Energy Profile 2.0 Application Protocol Specification, ZigBee Alliance and HomePlug Powerline Alliance Liaison, Jul. 2012, 352 pgs.

* cited by examiner

IDENTIFYING SERVER PROTOCOL FOR TRANSLATION IN SMART GRID

BACKGROUND

The specification relates to smart grid technologies. In particular, the specification relates to managing data communication in a smart grid communication network.

A utility server and an electric vehicle may use a single communication protocol to communicate with each other. However, communication protocols used in data communication between utility servers and electric vehicles may be different in various geographic locations. For example, in the United States a smart energy profile (SEP) 2.0 protocol may be used by both a utility server and an electric vehicle for data communication; however, in Japan an ECHONET Lite protocol may be used. It is difficult for an original equipment manufacturer (OEM) to produce electric vehicles that implement different communication protocols. Furthermore, the utility server may update the communication protocol in a short term or use a new communication protocol. However, an average life time of an electric vehicle can be more than 10 years. Therefore, some mechanisms that prevent electric vehicles from being obsolete due to the update of the communication protocol are desirable. It is not easy for the electric vehicle to deal with the protocol update or accommodate the new protocol used in the utility server.

SUMMARY

The specification includes a system and method for managing data communication in a smart grid communication network. The system includes a communication module, a discovery module, a translation module and a smart grid module. The communication module receives data initiating smart grid communication between a utility server and a communication node. The discovery module identifies a server protocol used by the utility server to communicate with the communication node. The discovery module identifies a node protocol used by the communication node to communicate with the utility server. The node protocol is incompatible with the server protocol. The translation module performs a protocol translation between the server protocol and the node protocol. The smart grid module handles the smart grid communication between the utility server and the communication node using the protocol translation.

The system is particularly advantageous in numerous respects. First, the system includes a gateway that accommodates different server protocols employed by utility servers and different node protocols employed by communication nodes. The gateway translates server protocols to node protocols and vice versa. The system enables a communication node to communicate with different utility servers using a common node protocol. The system also enables a utility server to communicate with different communication nodes using a common server protocol. The system is protocol agnostic since, for example, a utility server does not need to care about node protocols used in communication nodes and a communication node does not need to care about server protocols used in utility servers. Second, the system is cost efficient since a communication node can use its own protocol to communicate with different utility servers and an OEM producing the communication node does not need to prepare and test different protocols that may be used in different geographic locations. Third, the system can incorporate protocol updates or new protocols easily. For example, if server protocols are updated or new server protocols are used, the system can update data stored in a storage device of the gateway (e.g., firmware in the gateway) and there is no need to modify the communication node in order to accommodate the server protocol updates.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
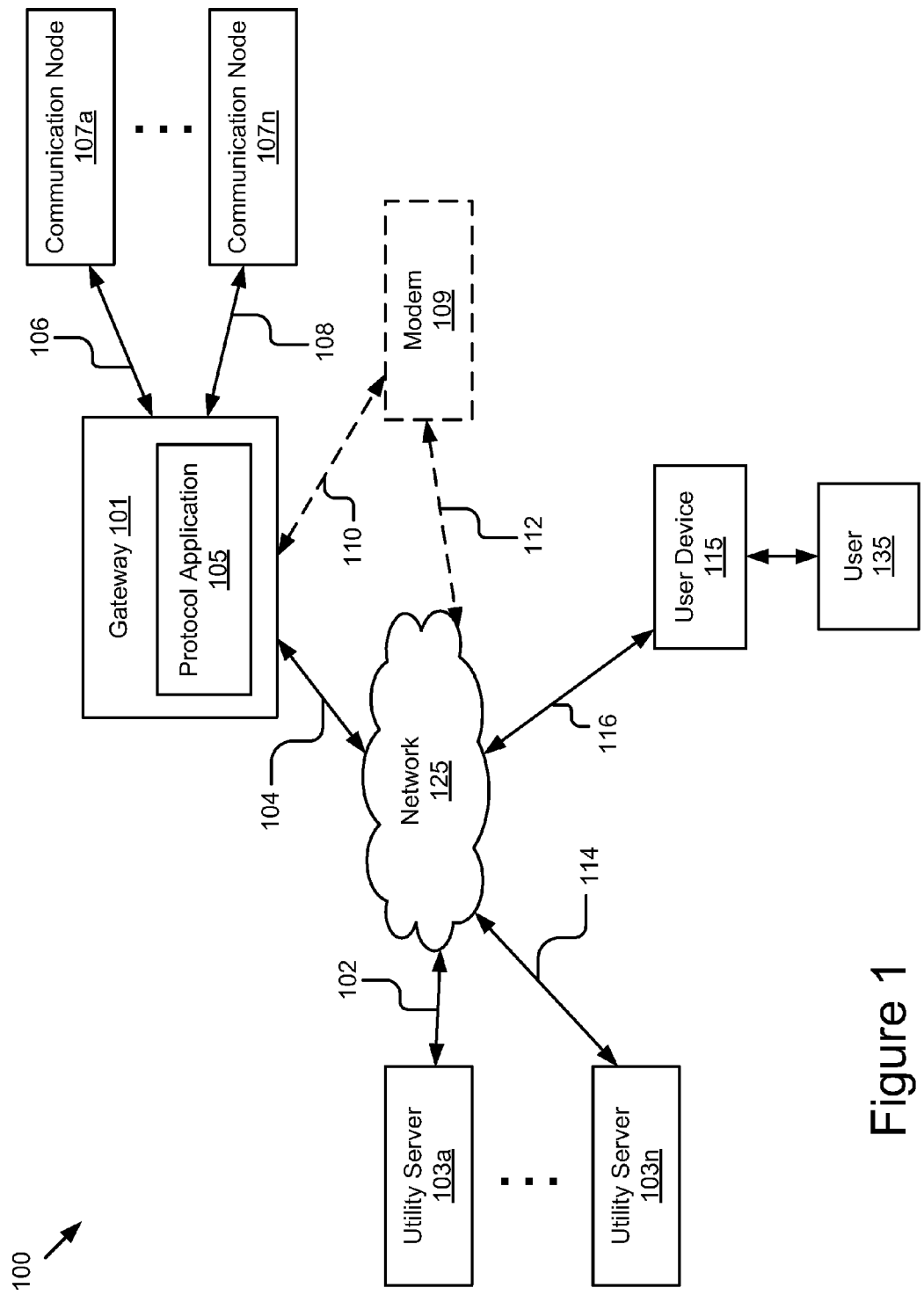
FIG. 1 is a high-level block diagram illustrating a system for managing data communication in a smart grid communication network according to one embodiment.

A system and method for managing data communication in a smart grid communication network is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for managing data communication in a smart grid communication network according to one embodiment. The illustrated system 100 includes a user device 115 that is accessed by a user 135, a gateway device 101, a modem 109, utility servers 103a . . . 103n (referred to individually and collectively as 103) and communication nodes 107a . . . 107n (referred to individually and collectively as 107). The modem 109 is depicted using a dashed line to indicate that it is an optional feature in the system 100. While only one gateway device 101, one modem 109, one user device 115, two communication nodes 107 and two utility servers 103 are depicted in FIG. 1, the system 100 could include one or more gateway devices 101, one or more modems 109, one or more user devices 115, one or more communication nodes 107 and one or more utility servers 103. In some embodiments, the system 100 may include other servers and/or devices not shown in FIG. 1 such as a display device and an input device, etc.

In the illustrated embodiment, the entities of the system 100 are communicatively coupled to a network 125. The utility server 103a is communicatively coupled to the network 125 via signal line 102. The utility server 103n is communicatively coupled to the network 125 via signal line 114. The communication node 107a is communicatively coupled to the gateway 101 via signal line 106. The communication node 107n is communicatively coupled to the gateway 101 via signal line 108. The user device 115 is communicatively coupled to the network 125 via signal line 116. The gateway 101 is communicatively coupled to the network 125 via signal line 104. In one embodiment, the gateway 101 is communicatively coupled to the network 125 via the modem 109. For example, the gateway 101 is coupled to the modem 109 via signal line 110, and the modem 109 is connected to the network 125 via signal line 112.

The gateway 101 is any device for handling communications between a communication node 107 and a utility server 103 via a network 125. For example, the gateway 101 is a home gateway device that manages any services provided to a communication node 107 (e.g., charging service, billing service, power load balance, power safety service, etc.). In the illustrated embodiment, the gateway 101 includes a protocol application 105.

The protocol application 105 is code and routines for managing communication protocols and handling communications between a utility server 103 and a communication node 107. In one embodiment, the protocol application 105 includes code and routines stored in an on-chip storage of a processor (not pictured) included in the gateway 101. In another embodiment, the protocol application 105 is implemented using hardware such as a field-programmable gate array (FPGA) or an application-specific integrated circuit (ASIC). In yet another embodiment, the protocol application 105 is implemented using a combination of hardware and software. The protocol application 105 is described below in more detail with reference to FIGS. 2-5.

The utility server 103 is any computing device. For example, the utility server 103 is a hardware server including a processor (not pictured), a memory (not pictured) and network communication capabilities. In one embodiment, the utility server 103 applies a server protocol to communicate with one or more communication nodes 107 via the gateway 101 and provides utility service (e.g., electric vehicle charging service, billing service for utility usage, etc.) to the one or more communication nodes 107. A server protocol is a communication protocol used by a utility server 103 in smart grid communication. For example, a server protocol is a smart energy profile version 2 (SEP2.0) used in the United States or an ECHONET Lite used in Japan. Other example server protocols are possible. Smart grid communication includes any data communication occurring in smart grid. In one embodiment, the smart grid includes an interconnected communications and power distribution network that is intended to streamline power generation, transmission, distribution, monitoring and control.

In one embodiment, a utility server 103 applies a server protocol to perform various energy management functions in smart grid communication. Example energy management functions include, but are not limited to, smart meter reading that records power usage in real time, load adjustment depending on current power demand and power supply, automatic fault detection and self-healing to improve network reliability, flexible billing and pricing service (e.g., flat rate; variable rate depending on one or more of power supply and demand, geographic locations, the season and the time of day, etc.) and renewable energy integration (e.g., integrating solar power and wind power into smart grid), etc.

For example, the utility server 103 applies a server protocol in smart grid communication to monitor and control the charging of an electric vehicle at home. Depending on current power supply and demand in the local region, the utility server 103 may adjust load balance by specifying a delayed charging start time for the electric vehicle so that the power supply and demand in the local region can be balanced. In other examples, the utility server 103 may apply the server protocol to provide other services to a communication node 107 in a smart grid communication network, e.g., to bill the power usage consumed by the communication node 107 with different rates in different charging times.

In some implementations, different utility servers 103 use different server protocols for communication with each other and for communication with the communication nodes 107 in a smart grid communication network. For example, a first utility server 103 applies a first server protocol to communicate with a second utility server 103. However, the second utility server 103 applies a second server protocol to communicate with the first utility server 103. In this scenario, a protocol translation between the first server protocol and the second server protocol is required for the smart grid communication between the first utility server 103 and the second utility server 103. The protocol translation is described below in more detail with reference to FIG. 2.

The communication node 107 is any node that communicates with a utility server 103 using a node protocol. For example, the communication node 107 can be one of an electric vehicle, a hybrid electric vehicle, an electric vehicle supply equipment (EVSE) or any other electric device such as a smart appliance programmed to operate when the power rate is lowest in a day. In one embodiment, an electric vehicle or a hybrid electric vehicle is connected to the gateway 101 via an electric vehicle supply equipment. In another embodiment, an electric vehicle is directly connected to the gateway 101.

A node protocol is a communication protocol used by a communication node 107 in smart grid communication. In one embodiment, a node protocol used by a communication node 107 is compatible with a server protocol used by a utility server 103. For example, the node protocol and the server protocol are the same protocol. In this scenario, no protocol translation between the node protocol and the server protocol is required for the smart grid communication between the utility server 103 and the communication node 107. In another embodiment, a node protocol used by a communication node 107 is different from and incompatible with a server protocol used by a utility server 103. In this scenario, a protocol translation between the node protocol and the server protocol is required for the smart grid communication between the utility server 103 and the communication node 107.

In some embodiments, the communication node 107 applies a node protocol for communication with one or more utility servers 103 via the gateway 101. For example, the communication node 107 uses a node protocol to communicate with a utility server 103 for requesting a charging service or a billing service, etc., from the utility server 103. In some implementations, the node protocol is a common protocol used by the communication node 107 to communicate with utility servers 103 via a gateway 101, where each utility server 103 may apply a different server protocol in smart grid communication. In some embodiments, different communication nodes 107 use different node protocols to communicate with a utility server 103 in smart grid communication. For example, while a first communication node 107 uses a first node protocol to communicate with a utility server 103, a second communication node 107 uses a second node protocol to communicate with the same utility server 103.

The modem 109 is a device that acts as a modulator and a demodulator. For example, the modem 109 modulates a carrier signal to encode digital information. In another example, the modem 109 demodulates the carrier signal to decode the transmitted information carried by the carrier signal. For example, the modem 109 encodes data received from the gateway 101 using a carrier signal and sends the encoded carrier signal to the utility server 103. In another example, the modem 109 decodes data from a carrier signal that is received from the utility server 103 and sends the decoded data to the gateway 101.

The user device 115 is a computing device that includes a memory (not shown) and a processor (not shown), for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network 125. In the illustrated implementation, the user 135 interacts with the user device 115.

The network 125 is a conventional type of network, wired or wireless, and may have any number of configurations such as a star configuration, token ring configuration or other configurations known to those skilled in the art. In one embodiment, the network 125 includes one or more of a local area network (LAN), a wide area network (WAN) (e.g., the Internet) and/or any other interconnected data path across which multiple devices communicate. In another embodiment, the network 125 is a peer-to-peer network. The network 125 is coupled to or includes portions of a telecommunications network for sending data in a variety of different communication protocols. For example, the network 125 is a 3G network or a 4G network. In yet another embodiment, the network 125 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 125 are encrypted using conventional encryption technologies such as secure sockets layer (SSL), secure HTTP and/or virtual private networks (VPNs).

Protocol Application

Figure 2:
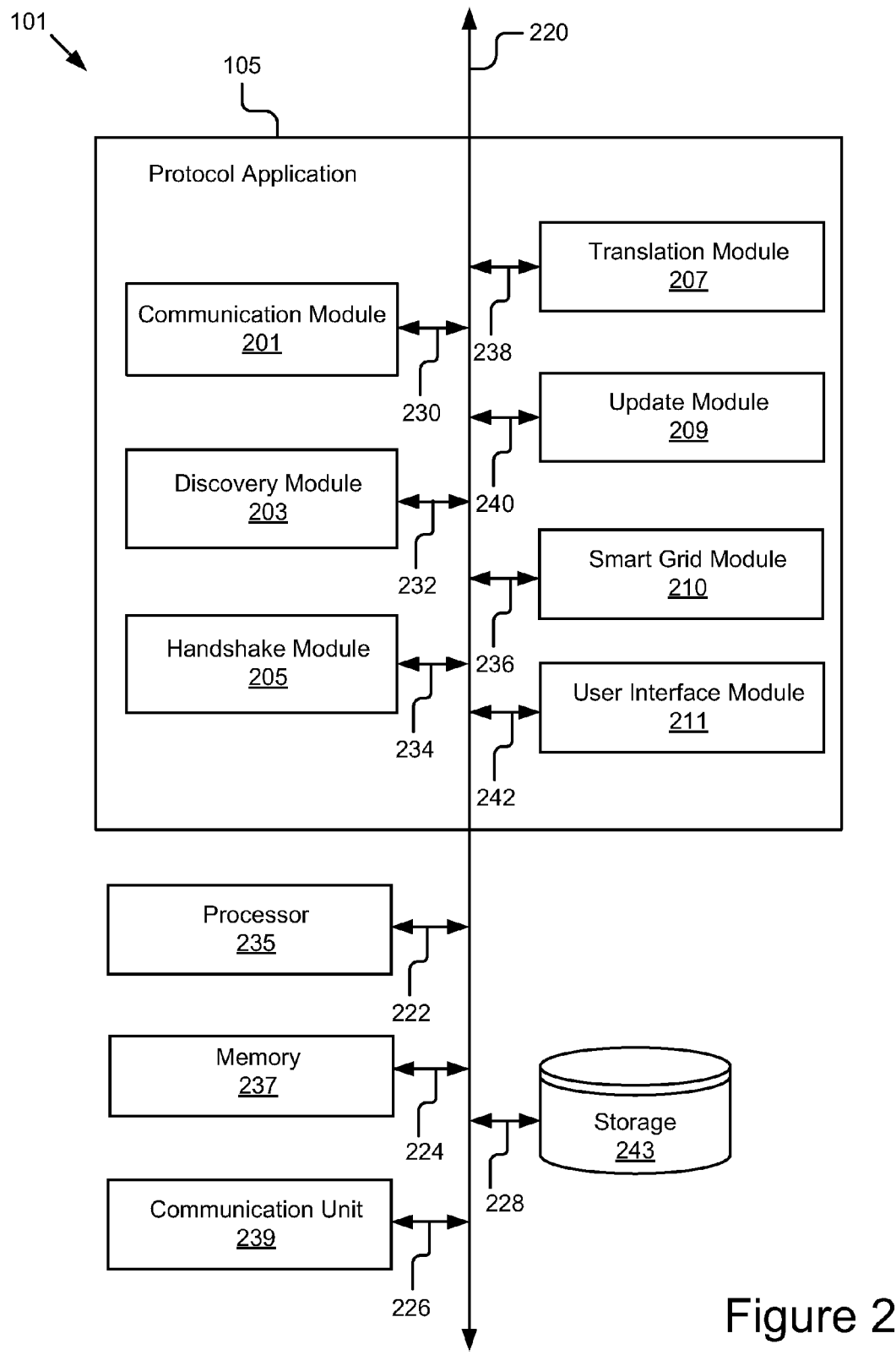
FIG. 2 is a block diagram illustrating a protocol application according to one embodiment.

Referring now to FIG. 2, the protocol application 105 is shown in more detail. FIG. 2 is a block diagram illustrating a gateway 101 according to one embodiment. The gateway 101 includes the protocol application 105, a processor 235, a memory 237, a communication unit 239 and a storage device 243. These components of the gateway 101 are communicatively coupled by a bus 220.

The processor 235 includes an arithmetic logic unit, a microprocessor, a general purpose controller or some other processor array to perform computations, retrieve data stored on the memory 237 and other storage devices, etc. In the illustrated embodiment, the processor 235 is communicatively coupled to the bus 220 via signal line 222. Processor 235 processes data signals and may include various computing architectures including a complex instruction set computer (CISC) architecture, a reduced instruction set computer (RISC) architecture, or an architecture implementing a combination of instruction sets. Although only a single processor 235 is shown in FIG. 2, multiple processors 235 may be included. The processing capability may be limited to supporting the display of images and the capture and transmission of images. The processing capability might be enough to perform more complex tasks, including various types of feature extraction and sampling. In other embodiments, other processors, operating systems, sensors, displays and physical configurations are possible.

The memory 237 stores instructions and/or data that may be executed by the processor 235. In the illustrated embodiment, the memory 237 is communicatively coupled to the bus 220 via signal line 224. The instructions and/or data may include code for performing the techniques described herein. The memory 237 may be a dynamic random access memory (DRAM) device, a static random access memory (SRAM) device, flash memory or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 239 handles communications between the gateway 101 and other entities of the system 100. The communication unit 239 is communicatively coupled to the bus 220 via signal line 226. In one embodiment, the communication unit 239 includes a network interface for connecting the gateway 101 to the network 125. In one embodiment, the communication unit 239 includes a port for direct physical connection to the network 125 or to another communication channel. For example, the communication unit 239 includes a universal serial bus (USB), category 5 cable (CAT-5) or similar port for wired communication with the network 125. In another embodiment, the communication unit 239 includes a wireless transceiver for exchanging data with the network 125, or with another communication channel, using one or more wireless communication methods, such as IEEE 802.11, IEEE 802.16, BLUETOOTH®, near field communication (NFC) or another suitable wireless communication method. In one embodiment, the communication unit 239 includes a NFC chip that generates a radio frequency (RF) for short-range communication.

In some embodiments, the communication unit 239 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 239 also provides other conventional connections to the network 125 for distribution of files and/or media objects using standard network protocols including TCP/IP, HTTP, HTTPS and SMTP, etc.

The storage device 243 is a non-transitory memory that stores data. For example, the storage device 243 is a dynamic random access memory (DRAM) device, a static random access memory (SRAM) device, flash memory or some other memory device. In one embodiment, the storage device 243 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device. The storage 243 is communicatively coupled to the bus 220 via signal line 228.

In one embodiment, the storage 243 stores data for providing the functionality described herein. For example, the storage 243 stores one or more of: data describing one or more server protocols used by one or more utility servers 103; data describing one or more node protocols used by one or more communication nodes 107; and update data describing one or more updates for the server protocols or node protocols, or both. In some embodiments, the storage 243 may store any other data for providing the functionality described herein.

In the illustrated embodiment shown in FIG. 2, the protocol application 105 includes a communication module 201, a discovery module 203, a handshake module 205, a translation module 207, an update module 209, a smart grid module 210 and a user interface module 211. These components of the protocol application 105 are communicatively coupled to the bus 220 for communication with each other or other components of the gateway 101. In some embodiments, each module in the protocol application 105 is a set of instructions executable by the processor 235 to provide the functionality described below. In other embodiments, each module in the protocol application 105 is stored in the memory 237 of the gateway 101 and is accessible and executable by the processor 235.

The communication module 201 is code and routines that, when executed by the processor 235, handles communication between components of the protocol application 105 and other components of the system 100. For example, the communication module 201 receives update data for a server protocol from a utility server 103 via the communication unit 239 and sends the update data to the update module 209. In another example, the communication module 201 receives node protocol data that is converted from server protocol data from the smart grid module 210 and sends the converted node protocol data to a communication node 107 via the communication unit 239. The communication module 201 is communicatively coupled to the bus 220 via signal line 230.

In one embodiment, the communication module 201 receives data (e.g., update data) from other components of the protocol application 105 (e.g., the update module 209) and stores the data in the storage 243. In another embodiment, the communication module 201 retrieves data from the storage 243 and sends the data to other components of the protocol application 105. In yet another embodiment, the communication module 201 handles communication among components of the protocol application 105. For example, the communication module 201 receives translation data describing a protocol translation between a server protocol and a node protocol from the translation module 207 and sends the translation data to the smart grid module 210. In other embodiments, the communication module 201 may provide any other functionality for handling communication described herein.

The discovery module 203 is code and routines that, when executed by the processor 235, discovers server protocols used in utility servers 103 or node protocols used in communication nodes 107, or both. The discovery module 203 is communicatively coupled to the bus 220 via signal line 232. In one embodiment, the discovery module 203 receives data indicating an initialization of smart grid communication between a utility server 103 and a communication node 107 from one or more of the utility server 103 and the communication node 107. For example, the discovery module 203 receives, from the communication node 107, data describing a request for charging service from the utility server 103. The discovery module 203 determines a server identifier (ID) identifying the utility server 103 and a node ID identifying the communication node 107 based on the received data.

Examples of a server ID include, but are not limited to, an address of the utility server 103 (e.g., an Internet Protocol (IP) address, a uniform resource locator (URL), an email address, a geographic location, etc.), a name of the utility server 103 and any other identification data capable of identifying the utility server 103. Examples of a node ID include, but are not limited to, an address of the communication node 107 (e.g., an IP address, a URL, a geographic location such as a home address, etc.), a manufacture serial number (e.g., an original equipment manufacturer (OEM) number, a vehicle identification number), a brand and a model of the communication node 107 (e.g., a manufacturer and a model for an electric vehicle) and any other identification data capable of identifying the communication node 107.

The discovery module 203 identifies a server protocol used in the utility server 103 and a node protocol used in the communication node 107 respectively. For example, the discovery module 203 cross-references communication protocols stored in the storage device 243 using the server ID and the node ID, and retrieves a first communication protocol matching the server ID as a server protocol and a second communication protocol matching the node ID as a node protocol from the storage 243. In another example, the discovery module 203 sends a protocol inquiry message to the utility server 103 and the communication node 107 respectively, and receives data describing a server protocol from the utility server 103 and data describing a node protocol from the communication node 107.

In one embodiment, the discovery module 203 stores one or more of the identified server protocol, the identified node protocol, an association between the identified server protocol and the utility server 103 and an association between the identified node protocol and the communication node 107 in the storage 243. In another embodiment, the discovery module 203 sends data describing the identified server protocol and the identified node protocol to one or more of the handshake module 205, the translation module 207 and the smart grid module 210.

The handshake module 205 is code and routines that, when executed by the processor 235, performs a handshake process with a utility server 103 or a communication node 107, or both. The handshake module 205 is communicatively coupled to the bus 220 via signal line 234. In one embodiment, the handshake module 205 receives data describing a server protocol used in the utility server 103 and a node protocol used in the communication node 107 from the discovery module 203. The handshake module 205 performs a first handshake process with the utility server 103 and a second handshake process with the communication node 107 respectively. For example, the handshake module 205 negotiates with the utility server 103 and dynamically sets up one or more parameters for using the server protocol to communicate with the utility server 103. In another example, the handshake module 205 negotiates with the communication node 107 and dynamically sets up one or more parameters for using the node protocol to communicate with the communication node 107.

A handshake process is an automated process dynamically establishing one or more parameters for smart grid communication between two entities. Example parameters include, but are not limited to, a data transfer rate, a coding rate, parity check, exceptions and interrupt procedures, any other parameters to initialize communication with the utility server 103 using the server protocol and any other parameters to initialize communication with the communication node 107 using the node protocol.

The translation module 207 is code and routines that, when executed by the processor 235, performs a protocol translation between different communication protocols. The translation module 207 is communicatively coupled to the bus 220 via signal line 238. In one embodiment, the translation module 207 receives a server protocol used by a utility server 103 and a node protocol used by a communication node 107 from the discovery module 203. The translation module 207 performs a protocol translation between the server protocol and the node protocol so that the smart grid module 210 can handle smart grid communication between the utility server 103 and the communication node 107 using the protocol translation. For example, the translation module 207 maps a specification describing the server protocol to a corresponding specification describing the node protocol, and vice versa. In a further example, the translation module 207 maps rules, procedures, function sets and terminology, etc., used in the server protocol to corresponding rules, procedures, function sets and terminology, etc., used in the node protocol, and vice versa.

In one embodiment, the translation module 207 receives a first server protocol used in a first utility server 103 and a second server protocol used in a second utility server 103 from the discovery module 203. The translation module 207 performs a protocol translation between the first server protocol and the second server protocol so that the smart grid module 210 can handle smart grid communication between the first utility server 103 and the second utility server 103 using the protocol translation.

In one embodiment, the translation module 207 receives an updated server protocol from the update module 209 and performs a protocol translation between the updated server protocol and the node protocol. In another embodiment, the translation module 207 receives an updated node protocol from the update module 209 and performs a protocol translation between the server protocol and the updated node protocol. In yet another embodiment, the translation module 207 performs a protocol translation between an updated server protocol and an updated node protocol.

In one embodiment, the translation module 207 stores translation data describing the protocol translation in the storage 243. In another embodiment, the translation module 207 sends the translation data to the smart grid module 210.

The update module 209 is code and routines that, when executed by the processor 235, updates one or more of a server protocol and a node protocol. The update module 209 is communicatively coupled to the bus 220 via signal line 240. In one embodiment, the update module 209 detects an update for a server protocol, retrieves update data describing the update from the utility server 103 and updates the server protocol using the update data in the gateway 101. In another embodiment, the update module 209 detects an update for a node protocol, retrieves update data describing the update from the communication node 107 and updates the node protocol using the update data in the gateway 101.

When the server protocol used in the utility server 103 has been updated, it is beneficial to update the server protocol in the gateway 101 since, for example, the communication node 107 does not need to update its node protocol and can still use the node protocol for smart grid communication with the utility server 103 as long as a protocol translation between the node protocol and the updated server protocol is performed for the smart grid communication. This prevents the node protocol used in the communication node 107 from being obsolete due to the update of the server protocol.

When the node protocol used in the communication node 107 has been updated, it is beneficial to update the node protocol in the gateway 101 since, for example, the utility server 103 does not need to update its server protocol and can still use the server protocol for smart grid communication with the communication node 107 as long as a protocol translation between the updated node protocol and the server protocol is performed for the smart grid communication. This prevents the server protocol used in the utility server 103 from being obsolete due to the update of the node protocol.

In one embodiment, a new utility server 103 which uses a new server protocol for smart grid communication is added to the system 100. The update module 209 receives data describing the new server protocol from the new utility server 103 and stores the new server protocol in the storage 243. The translation module 207 performs protocol translations between the new server protocol and other server protocols or node protocols in the gateway 101 so that the new utility server 103 can communicate with other utility servers 103 or communication nodes 107 using its new server protocol via the gateway 101.

In another embodiment, a new communication node 107 which uses a new node protocol for smart grid communication is added to the system 100. The update module 209 receives data describing the new node protocol from the new communication node 107 and stores the new node protocol in the storage 243. The translation module 207 performs protocol translations between the new node protocol and other server protocols in the gateway 101 so that the new communication node 107 can communicate with other utility servers 103 using its new node protocol via the gateway 101.

The smart grid module 210 is code and routines that, when executed by the processor 235, handles smart grid communication between a utility server 103 and a communication node 107. The smart grid module 210 is communicatively coupled to the bus 220 via signal line 236. In one embodiment, the smart grid module 210 receives a protocol translation between a server protocol used by a utility server 103 and a node protocol used by a communication node 107 from the translation module 207, and handles smart grid communication between the utility server 103 and the communication node 107 using the protocol translation. For example, the smart grid module 210 receives node protocol data that is organized using the node protocol from the communication node 107. The smart grid module 210 converts, based on the protocol translation, the node protocol data to server protocol data that is organized using the server protocol. The smart grid module 210 sends the server protocol data to the utility server 103. In another example, the smart grid module 210 receives server protocol data that is organized using the server protocol from the utility server 103. The smart grid module 210 converts, based on the protocol translation, the server protocol data to node protocol data that is organized using the node protocol. The smart grid module 210 sends the node protocol data to the communication node 107.

Node protocol data is any data having a data structure complied with a node protocol. In one embodiment, the node protocol data includes data to be transmitted from a communication node 107 to a utility server 103. Server protocol data is any data having a data structure complied with a server protocol. In one embodiment, the server protocol data includes data to be transmitted from a utility server 103 to a communication node 107 or to another utility server 103.

In one embodiment, the smart grid module 210 receives a protocol translation between a first server protocol used by a first utility server 103 and a second server protocol used by a second utility server 103 from the translation module 207, and handles smart grid communication between the first utility server 103 and the second utility server 103 using the protocol translation. For example, the smart grid module 210 receives a first set of server protocol data that is organized using the first server protocol from the first utility server 103. The smart grid module 210 converts the first set of server protocol data to a second set of server protocol data that is organized using the second server protocol based on the protocol translation. The smart grid module 210 sends the second set of server protocol data to the second utility server 103.

The implementation of smart grid communication using the protocol translation performed in the gateway 101 is advantageous, since not only the utility server 103 does not need to know what node protocol is used by the communication node 107 but also the communication node 107 does not need to know what server protocol is used by the utility server 103. The protocol translation implemented in the gateway 101 allows the utility server 103 to use its own server protocol and the communication node 107 to use its own node protocol when communicating with each other or communicating with other entities that use different communication protocols.

From the perspective of the utility server 103 and the communication node 107, the gateway 101 establishes a virtual communication path between the utility server 103 and the communication node 107, and through the virtual communication path the utility server 103 and the communication node 107 communicate with each other using different communication protocols. For example, the cooperation of (1) the protocol translation and (2) the handling of the smart grid communication based on the protocol translation establishes a virtual communication path for smart grid communication between the utility server 103 and the communication node 107, allowing the utility server 103 and the communication node 107 to communicate with each other using incompatible communication protocols.

The user interface module 211 is code and routines that, when executed by the processor 235, generates graphical data for providing user interfaces to users. The user interface module 211 is communicatively coupled to the bus 220 via signal line 242. In one embodiment, the user interface module 211 receives data describing a protocol translation between a server protocol and a node protocol from the translation module 207 and generates graphical data for providing a user interface that depicts the protocol translation to a user. The user interface module 211 sends the graphical data to the communication node 107, causing the communication node 107 to present the user interface to the user on a display device (not pictured) connected to the communication node 107. In one embodiment, the user interface module 211 sends the graphical data to the user device 115, causing the user device 115 to present the user interface to the user. In other embodiments, the user interface module 211 may generate graphical data for providing other user interfaces to users.

Methods

Figure 3:
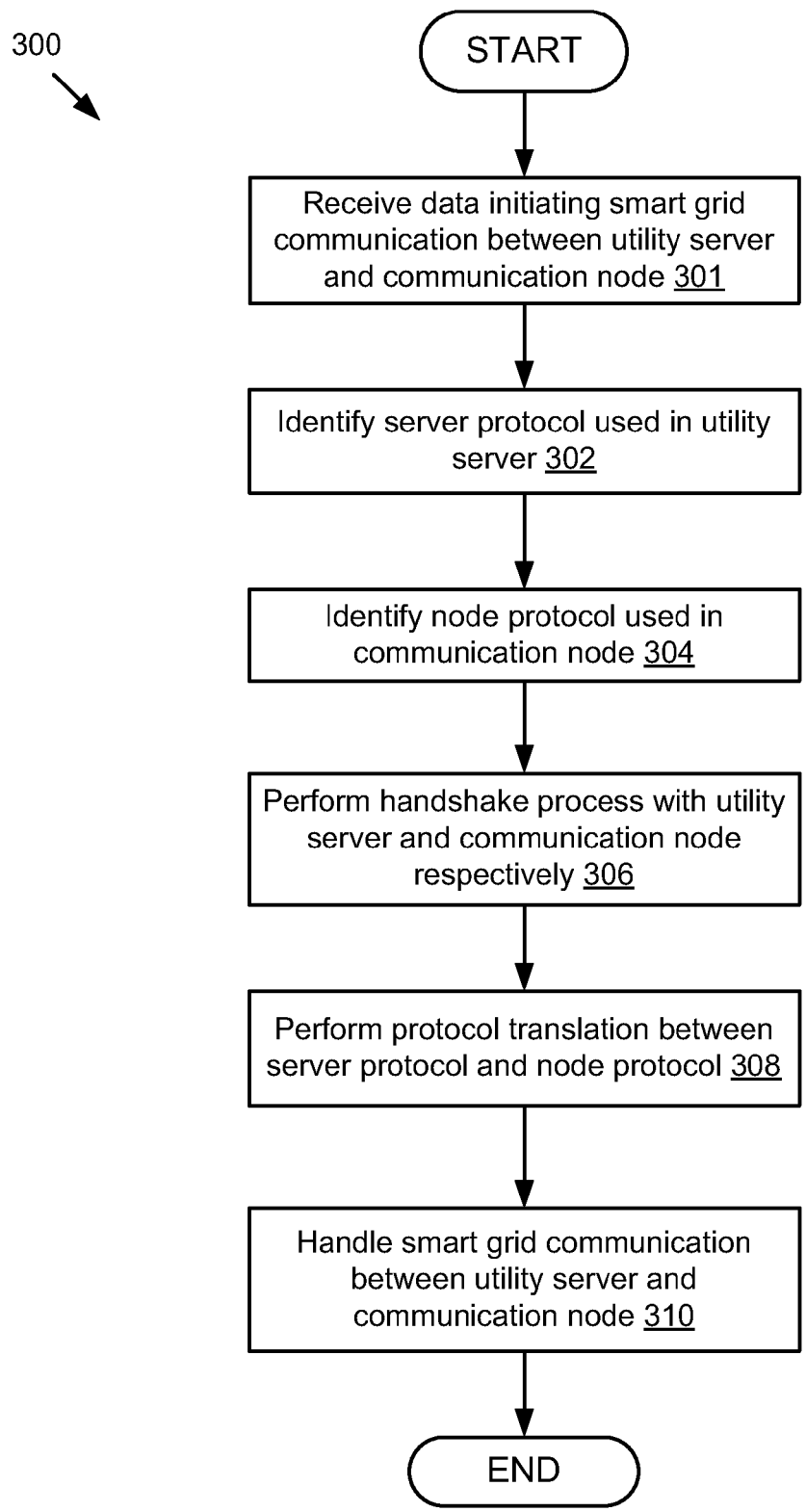
FIG. 3 is a flowchart illustrating a method for managing data communication in a smart grid communication network according to one embodiment.
Figure 4A:
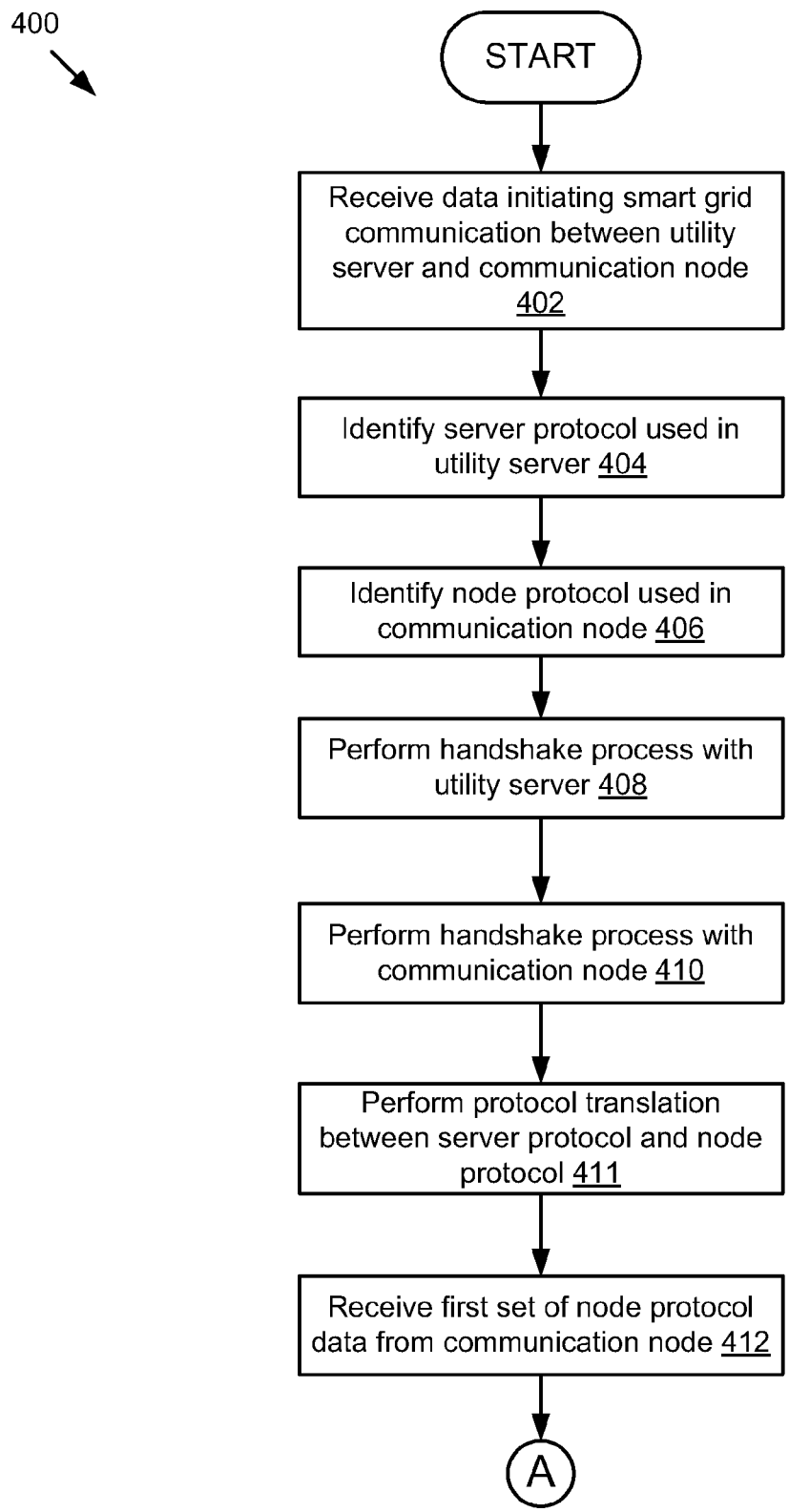
FIGS. 4A and 4B are flowcharts illustrating a method for managing data communication in a smart grid communication network according to another embodiment.
Figure 4B:
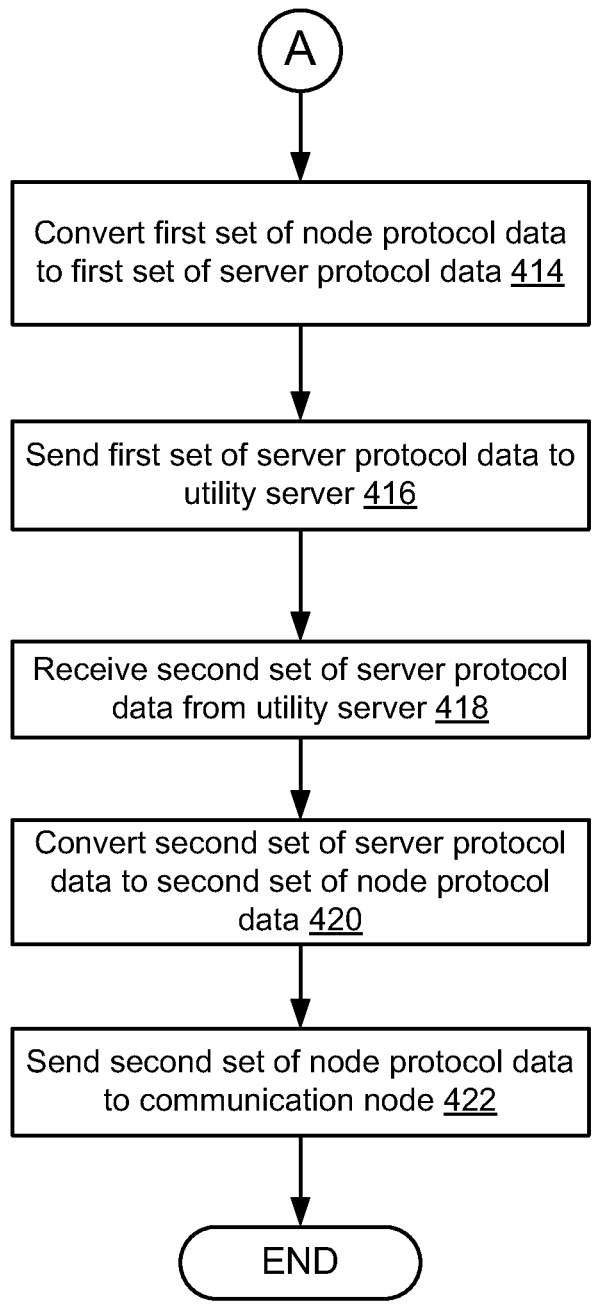
Figure 5:
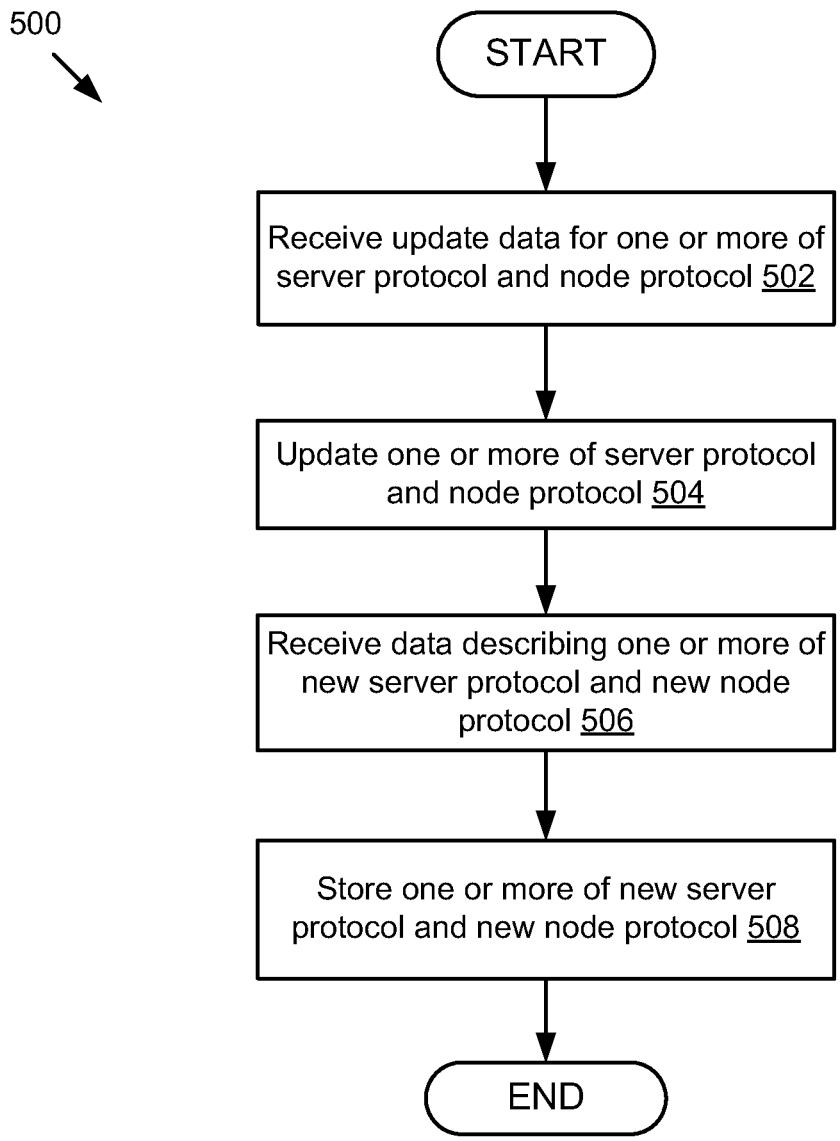
FIG. 5 is a flowchart illustrating a method for updating one or more of a server protocol and a node protocol in a gateway according to one embodiment.

Referring now to FIGS. 3-5, various embodiments of the method of the specification will be described. FIG. 3 is a flowchart illustrating a method 300 for managing smart grid communication according to one embodiment. The communication module 201 receives 301 data initiating smart grid communication between a utility server 103 and a communication node 107. The discovery module 203 identifies 302 a server protocol used in the utility server 103. The discovery module 203 identifies 304 a node protocol used in the communication node 107. The handshake module 205 performs 306 a handshake process with the utility server 103 and the communication node 107 respectively. The translation module 207 performs 308 a protocol translation between the server protocol and the node protocol. The smart grid module 210 handles 310 smart grid communication between the utility server 103 and the communication node 107 using the protocol translation.

FIGS. 4A and 4B are flowcharts illustrating a method 400 for managing smart grid communication according to another embodiment. Referring to FIG. 4A, the communication module 201 receives 402 data initiating smart grid communication between a utility server 103 and a communication node 107. The discovery module 203 identifies 404 a server protocol used in the utility server 103. The discovery module 203 identifies 406 a node protocol used in the communication node 107. The handshake module 205 performs 408 a handshake process with the utility server 103. The handshake module 205 performs 410 a handshake process with the communication node 107. The translation module 207 performs 411 a protocol translation between the server protocol and the node protocol. The communication module 201 receives 412 a first set of node protocol data from the communication node 107.

Referring to FIG. 4B, the smart grid module 210 converts 414 the first set of node protocol data to a first set of server protocol data using the protocol translation. The communication module 201 sends 416 the first set of server protocol data to the utility server 103. The communication module 201 receives 418 a second set of server protocol data from the utility server 103. The smart grid module 210 converts 420 the second set of server protocol data to a second set of node protocol data using the protocol translation. The communication module 201 sends 422 the second set of node protocol data to the communication node 107.

FIG. 5 is a flowchart illustrating a method 500 for updating one or more of a server protocol and a node protocol according to one embodiment. The communication module 201 receives 502 update data for one or more of a server protocol and a node protocol from one or more of a utility server 103 and a communication node 107. The update module 209 updates 504 one or more of the server protocol and the node protocol using the update data. In one embodiment, the communication module 201 receives 506 data describing one or more of a new server protocol and a new node protocol from one or more of a utility server 103 and a communication node 107. The update module 209 stores 508 the one or more of the new server protocol and the new node protocol in the storage 243.

Graphical Representations

Figure 6A:
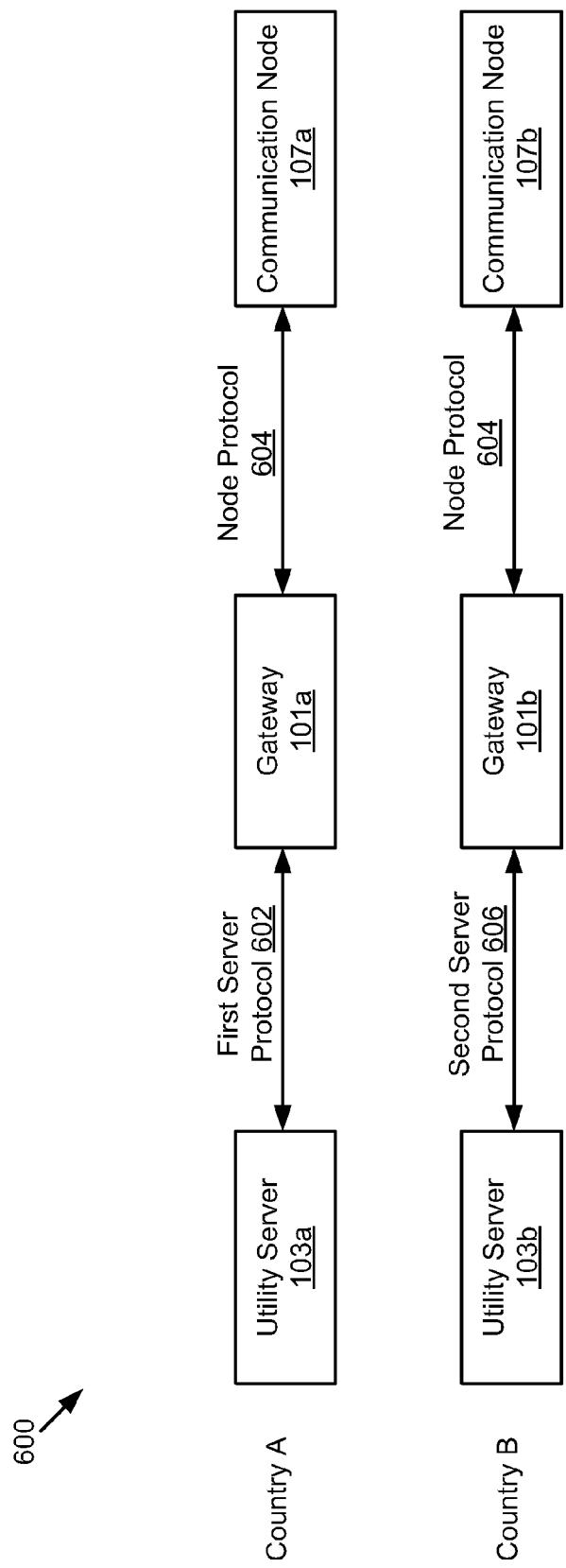
FIGS. 6A-6C are graphical representations illustrating various example scenarios to apply a gateway according to various embodiments.
Figure 6B:
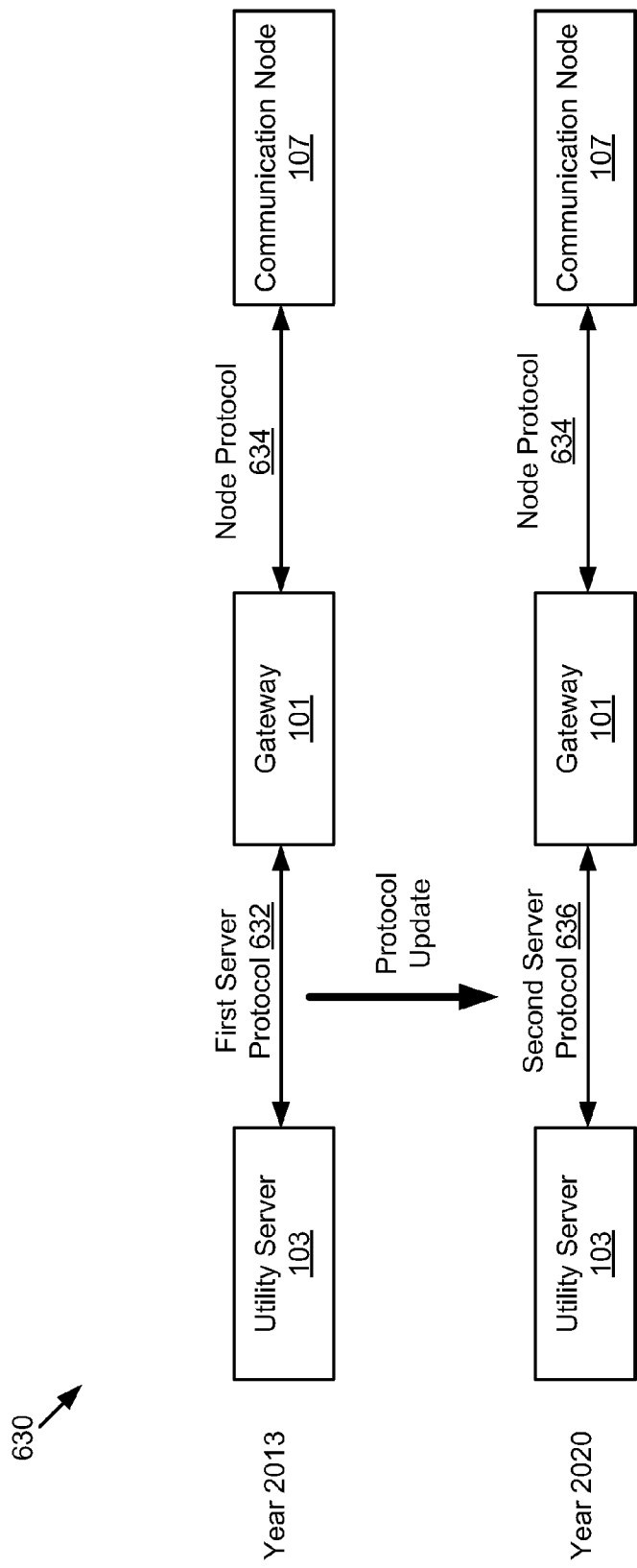
Figure 6C:
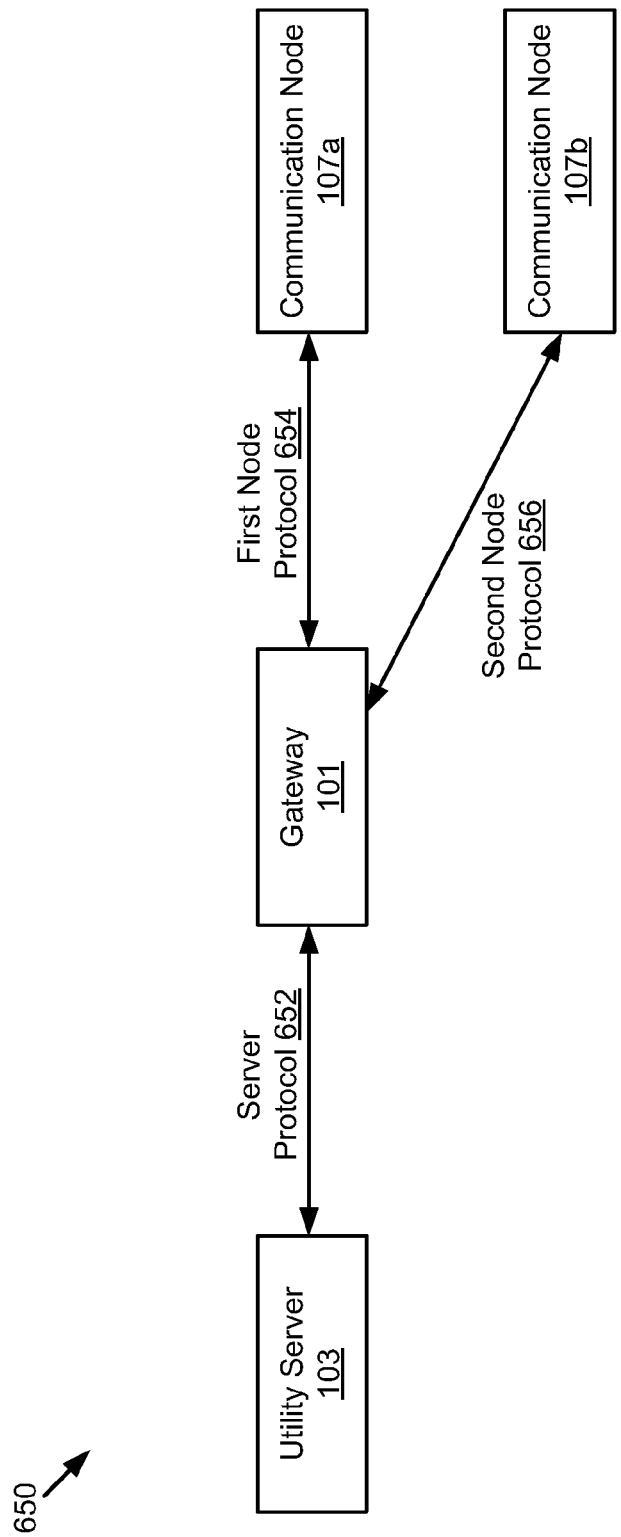

FIGS. 6A-6C are graphical representations 600, 630, 650 illustrating various example scenarios to apply a gateway 101 in a smart grid communication network according to various embodiments. Referring to FIG. 6A, communication nodes 107a and 107b use a common node protocol 604 for smart grid communication with utility servers 103a and 103b respectively; the utility server 103a in Country A communicates with the communication node 107a using a first server protocol 602; and the utility server 103b in Country B communicates with the communication node 107b using a second server protocol 606. The first server protocol 602 is different from the second server protocol 606. The communication node 107a communicates with the utility server 103a via the gateway 101a, where the gateway 101a performs a protocol translation between the node protocol 604 and the first server protocol 602 and handles smart grid communication between the utility server 103a and the communication node 107a using the protocol translation. The communication node 107b can communicate with the utility server 103b via the gateway 101b, where the gateway 101b performs a protocol translation between the node protocol 604 and the second server protocol 606 and handles smart grid communication between the utility server 103b and the communication node 107b using the protocol translation.

Referring to FIG. 6B, the utility server 103 uses a first server protocol 632 and the communication node 107 uses a node protocol 634 for smart grid communication with each other in Year 2013. The gateway 101 performs a protocol translation between the node protocol 634 and the first server protocol 632 and handles smart grid communication between the utility server 103 and the communication node 107 using the protocol translation. Assume in Year 2020 the first server protocol 632 is updated to a second server protocol 636 and the utility server 103 uses the second server protocol 636 for smart grid communication with the communication node 107. The gateway 101 updates the first server protocol 632 stored in the storage 243 to the second server protocol 636. The gateway 101 performs a protocol translation between the second server protocol 636 and the node protocol 634, so that the communication node 107 can still communicate with the utility server 103 using the node protocol 634 via the gateway 101. In this example scenario, the communication node 107 does not need to care about the update on the server protocol as long as the gateway 101 is modified according to the update on the server protocol.

Referring to FIG. 6C, the utility server 103 uses a server protocol 652 for smart grid communication with other entities. The communication node 107a uses a first node protocol 654 and the communication node 107b uses a second node protocol 656 for smart grid communication with the utility server 103. The gateway 101 performs a first protocol translation between the server protocol 652 and the first node protocol 654 and handles smart grid communication between the utility server 103 and the communication node 107a using the first protocol translation. The gateway 101 performs a second protocol translation between the server protocol 652 and the second node protocol 656 and handles smart grid communication between the utility server 103 and the communication node 107b using the second protocol translation.

This example illustrates that the utility server 103 can communicate with different communication nodes 107 that use different node protocols via the gateway 101.

Figure 7:
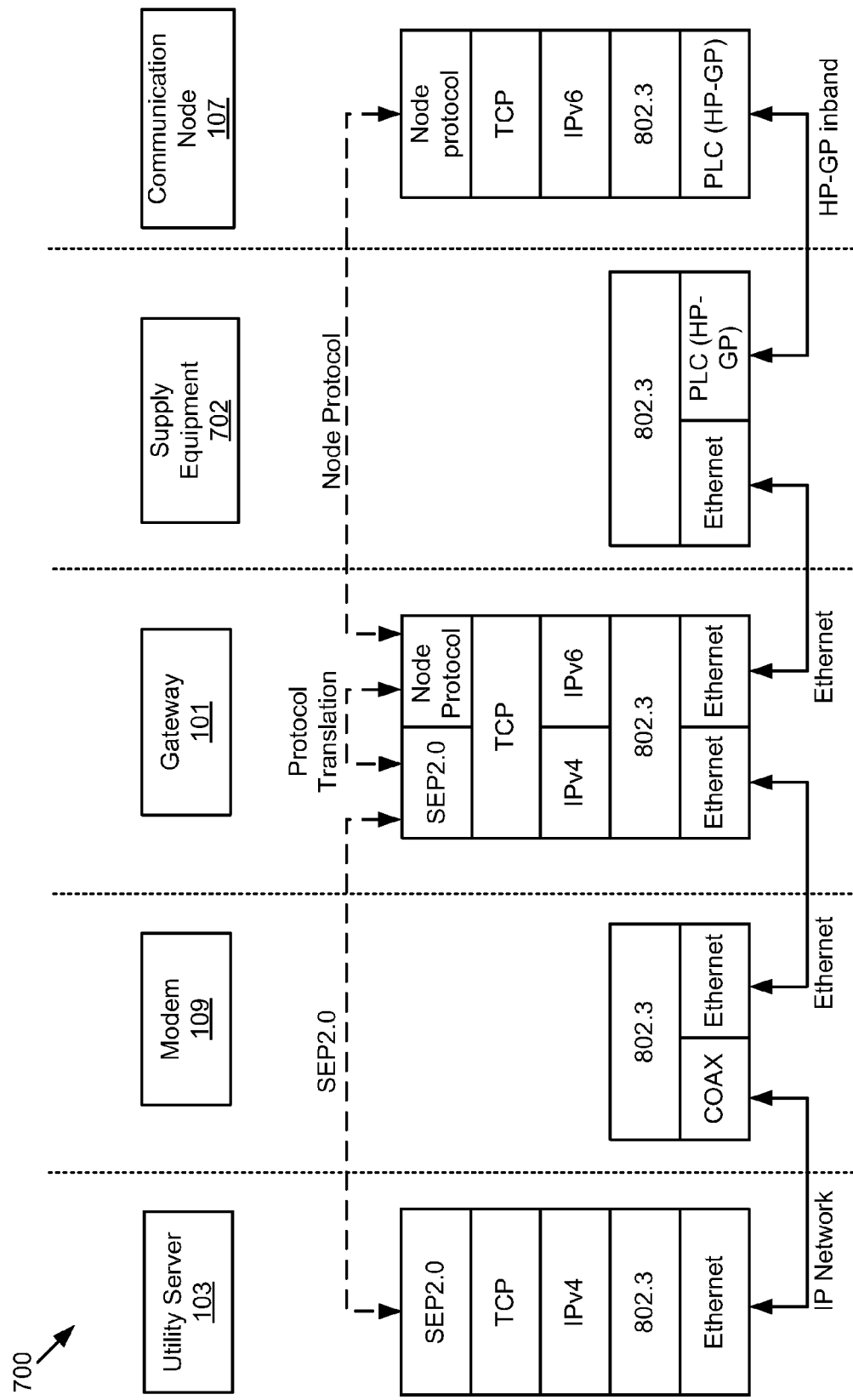
FIG. 7 is a graphical representation illustrating example protocols used in a smart grid communication network according to one embodiment.

FIG. 7 is a graphical representation 700 illustrating example protocols used in a smart grid communication network according to one embodiment. In the illustrated embodiment, the communication node 107 uses a node protocol in an application layer for smart grid communication with other entities. The communication node 107 uses a power line communication (PLC) HomePlug® Green PHY (HP-GP) standard in a physical layer. The communication node 107 communicates with the gateway 101 via a supply equipment 702 such as an electric vehicle supply equipment. Because the utility server 103 uses a server protocol SEP2.0 for smart grid communication, the gateway 101 performs a protocol translation between the server protocol SEP2.0 and the node protocol.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method, executing on one or more hardware processors, comprising:
   receiving, via a communication unit communicatively coupled to a network, data initiating smart grid communication between a utility server and a communication node;
   identifying, using the one or more hardware processors, a server protocol used by the utility server to communicate with the communication node;
   identifying, using the one or more hardware processors, a node protocol used by the communication node to communicate with the utility server, the node protocol being incompatible with the server protocol;
   performing, using the one or more hardware processors, a first protocol translation between the server protocol and the node protocol;
   handling the smart grid communication between the utility server and the communication node using the first protocol translation;
   receiving, via the communication unit, update data for the server protocol, the update data describing one or more updates for the server protocol;
   updating, using the one or more hardware processors, the server protocol based on the update data describing the one or more updates for the server protocol;
   performing, using the one or more hardware processors, a second protocol translation between the updated server protocol and the node protocol; and
   handling the smart grid communication between the utility server and the communication node using the second protocol translation.

2. The method of claim 1, wherein the node protocol is a common communication protocol used by the communication node to communicate with different utility servers that use different server protocols.

3. The method of claim 1, wherein the server protocol is a common communication protocol used by the utility server to communicate with different communication nodes that use different node protocols.

4. The method of claim 1, wherein handling the smart grid communication comprises:
   receiving, from the utility server, a first set of server protocol data that is organized using the server protocol;
   converting, based on the first protocol translation, the first set of server protocol data to a first set of node protocol data that is organized using the node protocol;
   sending the first set of node protocol data to the communication node;
   receiving, from the communication node, a second set of node protocol data that is organized using the node protocol;
   converting, based on the first protocol translation, the second set of node protocol data to a second set of server protocol data that is organized using the server protocol; and
   sending the second set of server protocol data to the utility server.

5. The method of claim 1, wherein the communication node is one of an electric vehicle, a hybrid electric vehicle, a smart appliance and an electric vehicle supply equipment.

6. The method of claim 1, further comprising:
   receiving data describing a new server protocol;
   performing a third protocol translation between the new server protocol and the node protocol; and
   handling the smart grid communication between the utility server and the communication node using the third protocol translation.

7. A computer program product comprising a non-transitory computer readable medium encoding instructions that, in response to execution by a computing device, cause the computing device to perform operations comprising:
   receiving data initiating smart grid communication between a utility server and a communication node;
   identifying a server protocol used by the utility server to communicate with the communication node;
   identifying a node protocol used by the communication node to communicate with the utility server, the node protocol being incompatible with the server protocol; and
   handling the smart grid communication between the utility server and the communication node using the first protocol translation receiving update data for the server protocol, the update data describing one or more updates for the server protocol;

updating the server protocol based on the update data describing the one or more updates for the server protocol;

performing a second protocol translation between the updated server protocol and the node protocol; and handling the smart grid communication between the utility server and the communication node using the second protocol translation.

8. The computer program product of claim 7, wherein the node protocol is a common communication protocol used by the communication node to communicate with different utility servers that use different server protocols.

9. The computer program product of claim 7, wherein the server protocol is a common communication protocol used by the utility server to communicate with different communication nodes that use different node protocols.

10. The computer program product of claim 7, wherein handling the smart grid communication comprises:

receiving, from the utility server, a first set of server protocol data that is organized using the server protocol;

converting, based on the first protocol translation, the first set of server protocol data to a first set of node protocol data that is organized using the node protocol;

sending the first set of node protocol data to the communication node;

receiving, from the communication node, a second set of node protocol data that is organized using the node protocol;

converting, based on the first protocol translation, the second set of node protocol data to a second set of server protocol data that is organized using the server protocol; and sending the second set of server protocol data to the utility server.

11. The computer program product of claim 7, wherein the communication node is one of an electric vehicle, a hybrid electric vehicle, a smart appliance and an electric vehicle supply equipment.

12. The computer program product of claim 7, wherein the instructions cause the computing device to perform operations further comprising:

receiving data describing a new server protocol;

performing a third protocol translation between the new server protocol and the node protocol; and handling the smart grid communication between the utility server and the communication node using the third protocol translation.

13. A system comprising:

one or more hardware processors;

a data communication unit coupled to the one or more hardware processors and to a computer network; and one or more non-transitory memories storing instructions that, when executed by the one or more hardware processors, specially program the system to perform operations including:

receiving, via the data communication unit, data initiating smart grid communication between a utility server and a communication node;

identifying a server protocol used by the utility server to communicate with the communication node;

identifying a node protocol used by the communication node to communicate with the utility server, the node protocol being incompatible with the server protocol;

performing a first protocol translation between the server protocol and the node protocol;

handling the smart grid communication between the utility server and the communication node using the first protocol translation;

receiving, via the data communication unit, the update data describing one or more updates for the server protocol;

updating the server protocol based on the update data describing the one or more updates for the server protocol;

performing a second protocol translation between the updated server protocol and the node protocol; and handling the smart grid communication between the utility server and the communication node using the second protocol translation.

14. The system of claim 13, wherein the node protocol is a common communication protocol used by the communication node to communicate with different utility servers that use different server protocols.

15. The system of claim 13, wherein the server protocol is a common communication protocol used by the utility server to communicate with different communication nodes that use different node protocols.

16. The system of claim 13, wherein the instructions, when executed by the one or more hardware processors, further specially program the system to perform operations including:

receiving, from the utility server via the data communication unit, a first set of server protocol data that is organized using the server protocol;

converting, based on the first protocol translation, the first set of server protocol data to a first set of node protocol data that is organized using the node protocol;

sending, via the data communication unit, the first set of node protocol data to the communication node;

receiving, from the communication node using the data communication unit, a second set of node protocol data that is organized using the node protocol;

converting, based on the first protocol translation, the second set of node protocol data to a second set of server protocol data that is organized using the server protocol; and sending, via the data communication unit, the second set of server protocol data to the utility server.

17. The system of claim 13, wherein the communication node is one of an electric vehicle, a hybrid electric vehicle, a smart appliance and an electric vehicle supply equipment.

18. The system of claim 13, wherein the instructions, when executed by the one or more hardware processors, further specially program the system to perform operations including:

receiving data describing a new server protocol;

performing a third protocol translation between the new server protocol and the node protocol; and handling the smart grid communication between the utility server and the communication node using the third protocol translation.

* * * * *